United States Patent [19]

Smagula et al.

[11] Patent Number: 5,011,704
[45] Date of Patent: Apr. 30, 1991

[54] FUDGE SAUCE AND FROZEN CONFECTION

[75] Inventors: Michael S. Smagula, Plainsboro, N.J.; Michael R. Tancredi, New Milford, Conn.

[73] Assignee: Kraft General Foods, Inc., Glenview, Ill.

[21] Appl. No.: 473,269

[22] Filed: Jan. 31, 1990

[51] Int. Cl.$^5$ ............................................. A23G 3/00
[52] U.S. Cl. ...................... 426/660; 426/578; 426/659; 426/100; 426/101; 426/103
[58] Field of Search ............ 426/660, 589, 578, 659, 426/100, 101, 103

[56] References Cited

U.S. PATENT DOCUMENTS

| | | | |
|---|---|---|---|
| 2,747,525 | 5/1956 | Lund | 426/282 |
| 2,801,922 | 8/1957 | Oprean | 426/101 |
| 4,234,611 | 11/1980 | Kahn et al. | 426/578 |
| 4,387,109 | 6/1983 | Kahn et al. | 426/321 |
| 4,525,365 | 6/1985 | Kato et al. | 426/100 |
| 4,789,552 | 12/1988 | Speakman et al. | 426/101 |

OTHER PUBLICATIONS

Woman's Day Encyclopedia of Cookery, vol. 10, Fawcett Publications Inc., New York (1966) p. 1526.

*Primary Examiner*—R. B. Penland
*Attorney, Agent, or Firm*—Thomas R. Savoie

[57] ABSTRACT

A fudge sauce which is flowable at freezer temperatures and a ready-to-eat dessert including it are provided. The fudge sauce comprises water, a mixture of saccharides to control the freezing point with balanced sweetness, a starch effective to build viscosity at freezer temperatures, a fat component to provide a desirable mouthfeel and a hydrophilic colloid to stabilize the viscosity. Desirably, the fudge sauce exhibits a relatively stable viscosity within the range of normal serving temperatures. In one embodiment, the sauce is combined as a center filling in an ice cream bar.

19 Claims, No Drawings

FUDGE SAUCE AND FROZEN CONFECTION

DESCRIPTION

1. Technical Field

The present invention relates to the field of dessert sauces; and, more particularly, to fudge sauces which exhibit a flowable consistency over a wide temperature range, including temperatures normally associated with frozen foods.

It has long been desired to have a variety of desserts and snack items which would be ready for consumption with no preparation other than simply opening the package. For example, ice cream snacks have been available which contain fudge sauces right in the container. Unfortunately, the fudge sauces typically tend to freeze solid. The enjoyment of eating is thus diminished.

Efforts to prepare dessert sauces and syrups to be soft at freezer temperature typically result in sauces which are either so sensitive to cold that they become unflowable like taffy at low temperatures or are liquid at all temperatures concerned. Some of these are excessively sweet due to the sugars employed to control freezing.

2. Background Art

Conventional, home-made dessert sauces typically employ sugars and fats to provide viscosity, body and mouthfeel. A typical example of this is hot fudge sauce which is thick, chocolaty and rich at serving temperature, but tends to harden too firm to eat at freezer temperatures.

It is known to provide a number of products which are soft at freezer temperatures. Representative of these products are batters, whippable toppings, salad dressings and dips, eggs, juices and other beverages, soups, ice cream, coffee lighteners, and many other products described, for example, in any of U.S. Pat. No. 4,387,109 and the predecessor patents listed therein. The disclosed purpose of these patents is to achieve the combined properties of microbiological stability during non-frozen storage and soft texture at freezer temperature. High fructose levels are employed to control freezing but often provide excessive sweetness when added in amounts sufficient to achieve both desired results. It is not a feature of these patents to provide fudge sauces which are flowable at freezer temperatures and exhibit relatively stable viscosities over a wide temperature range.

Composite frozen confections are known, such as represented by U.S. Pat. No. 2,747,525 which shows a composite confection having an ice cream inner core surrounded by a thick, but frozen fudge layer. Other confections are known which swirl a fudge sauce in ice cream. However, there is no known frozen confection having a flowable fudge center encased in ice cream.

There remains a need for a fudge sauce which exhibits a flowable consistency and a relatively stable viscosity profile over a temperature range typical for storing and serving frozen desserts, while maintaining the organoleptic qualities characteristic of like products at more typical serving temperatures, e.g., room temperature and above.

DISCLOSURE OF INVENTION

It is an object of the invention to provide fudge sauces which, at freezer temperatures, approximate the flowability of their conventional counterparts at their usual serving temperatures.

It is a more specific object of this invention to provide fudge sauces which are flowable at freezer temperatures yet provide organoleptic properties closely approximating those of their conventional counterparts at warmer temperatures.

It is yet another object of this invention to provide a ready-to-eat dessert comprising a frozen confection and a fudge sauce which is flowable at freezer temperatures and closely approximates the expected organoleptic properties of its conventional counterpart.

These and other objects are accomplished according to the invention which provides fudge sauces and ready-to-eat desserts which comprise a fudge sauce and a frozen confection. The fudge sauce is flowable at a temperature of $-12°$ C. and comprises: water; mono, di and polysaccharides in proportions effective to reduce the freezing point of the water to below $-12°$ C. while providing a desirable level of sweetness, preferably approximating that of sucrose; modified food starch in an amount effective to build viscosity at $-12°$ C.; fat in an amount effective to provide a desirable mouthfeel, preferably while not significantly increasing the viscosity of the sauce at $-12°$ C.; and, an amount of a hydrophilic colloid effective to stabilize the viscosity, preferably through freeze-thaw cycling and at higher temperatures.

Fudge sauces, particularly those with chocolate, caramel and butterscotch flavors, are characterized by a thick-yet-flowable (i.e., gooey) viscosity, a smooth mouthfeel and a pleasant level of sweetness. The fudge sauces of the present invention are further characterized by being flowable at ordinary home freezer temperatures. The term "flowable" is used in its broad sense and means that it will, by its own weight, flow to conform to the shape of its container. In some embodiments, the sauce should be thick enough to support a stick employed to hold a frozen confection for eating.

The sauces of the present invention preferably exhibit dynamic viscosities on the order of $5 \times 10^4$ poise or less at $-12°$ C., more preferably less than $2 \times 10^4$ poise. Desirably, these viscosities will be exhibited down to $-16°$ C. and even $-18°$ C. Dynamic viscosities used in this description are measured using a Rheometrics Mechanical Spectrometer (Model 7200) from Rheometrics Co., Piscataway, N.J., using a 25 mm parallel Plate fixture at 0.01 strain and a frequency of 1 Hertz, with the sample being at the indicated temperatures.

It is a feature of the invention that the sauces exhibit a relatively stable viscosity at temperatures within the ranges described. The dynamic viscosity as a function temperature is defined by the formula: $\text{Log}_{10} V_t = V_o + mT$, where $V_t$ is the dynamic viscosity in poise, $V_o$ is the viscosity at $0°$ C., m is the slope of the curve on a logarithmic plot and T is the temperature in question in $°$C. Desirably, the slope, m, will be within the range of from about $-0.1$ to about $-0.001/°$ C. More desirably, the fudge sauce will remain flowable but firm at $15°$ C., e.g., having a dynamic viscosity of at least $1 \times 10^3$ poise.

The fudge sauces of the invention are, due to their unique characteristics, useful over a wide temperature range. They may be packaged alone for use at any desired temperature from freezer to $80°$ C. or higher. Additionally, they can be packaged as part of a ready-to-eat dessert including a frozen confection such as ice cream, ice milk, melorine, or the like. In one preferred embodiment, a ready-to-eat dessert according to the invention comprises a chocolate coated ice cream bar on a stick including a fudge sauce center surrounding the stick.

The fudge sauce is an aqueous mixture comprising mixed saccharides, modified food starch, fat, and hydrophilic colloids. The sauce preferably contains milk solids and can be any desired flavor such as chocolate, caramel, butterscotch or the like. The total water in the sauce, including that added as a part of the ingredients, will typically be present in an amount of from about 30 to 60%, preferably from about 40 to 55%. The amount of water will be consistent with requirements for hydration of the ingredients which are selected and included in the correct amounts to provide a sauce which is flowable at freezer temperatures while having a desired level of sweetness, a good mouthfeel, and a relatively stable viscosity from freezer to room temperature.

The sauce will contain a mixture of saccharides other than starch in proportions and combined amounts effective to reduce the freezing point of the water in the sauce to below $-12°$ C. while providing a desired level of sweetness. Typical of the sweetness level is that which would be provided by sucrose in the amounts concerned. Desirably, the freezing point is depressed to at least $-16°$ C., most preferably to less than $-18°$ C.

The term "saccharide" as it is employed in the present context is to be understood as meaning any of a number of useful saccharide materials other than starches per se which are capable of lowering the freezing point of the sauce and providing sweetness. Saccharides will be selected to be stable in admixture against crystallization. Included in the list of useful saccharides are the monosaccharides, disaccharides and polysaccharides and their degradation products. Among the monosaccharides are pentoses, including aldopentoses, methylpentoses, and ketopentoses, like xylose and arabinose; a deoxyaldose like rhamnose; hexoses and reducing saccharides such as aldohexoses like glucose, galactose and mannose; and the ketohexoses, like fructose and sorbose. Fructose containing syrups, typically derived by isomerizing glucose syrups are particularly useful. Among the disaccharides are lactose, maltose and sucrose. Other polysaccharides such as dextrins, raffinose, and hydrolyzed starches which contain as their constituents oligosaccharides are also useful.

Typically, commercially-available invert sugar syrups can be used and contain dextrose and levulose. Typically, the sauces of the invention will employ from about 30 to 55%, preferably 35 to 50%, of a mixture of saccharides. The monosaccharides, such as fructose are important in achieving freezing point depression without sugar crystallization under the conditions encounted. Moreover, the monosaccharides are useful in controlling crystallization of sucrose and other saccharides. Preferred mixtures of saccharides will contain from 5 to 25%, more narrowly 8 to 15%, monosaccharides. More can be employed if desired, however, increasing the amounts too much will cause excessive sweetness. Typical levels of disaccharides, e.g., sucrose and lactose, will be from 25 to 70%, preferably from 30 to 60% of the mixture. The higher saccharides, e.g., polysaccharides, are desirably present at levels of from 25 to 65%, preferably from 30 to 60% of the mixture. In each case these percentages are by weight. Among the preferred polysaccharide mixtures 42 DE corn syrup and sucrose at a solids ratio of sucrose to corn syrup solids of from 1:10 to 2:1.

Sugar alcohols and other polyhydric alcohols may be used to replace a portion of the sugars used in this invention and are therefore encompassed by that term, i.e., up to about 5% of the formulations may be a polyhydric alcohol such as sorbitol, glycerol or the like.

The starch component of the sauce is preferably a modified food starch used in an amount effective to build viscosity within the above ranges at the temperatures defined above. Preferred modified starches are modified tapioca starches such as those known as hydroxyprophyl distarch phosphate. One preferred starch of this type is sold under the trademark FREEZIST M by AE Staley Manufacturing Company, Decatur, Ill. It will typically exhibit the following characteristics:

| Moisture | 10.0–13.0% |
|---|---|
| pH | 5.0–6.0 |
| Braebender viscosity in 3.5 pH Buffer Containing Sucrose: | |
| Initial viscosity | 275–375 B.U.* |
| Peak Viscosity | 375–465 B.U. |
| Viscosity after 30 min. @ 95° C. | 315–435 B.U. |
| Viscosity after 10 min. @ 50° C. | 485–680 B.U. |
| Viscosity Breakdown | 10–80 B.U. |

*Braebender Units

Other starches capable of imparting equivalent properties to the final product can also be employed. The starch will typically be present at a level of up to about 10%, preferably from 1 to 3%.

It also is desired in accordance with the present invention to formulate the sauce composition so as to contain non-milk fats or oils, i.e., any unprocessed or processed (e.g., hydrogenation, fractionation, interesterification) vegetable or animal fat or oil or fraction thereof such as derived from, e.g., soybean oil, corn oil, coconut oil, cottonseed oil, peanut oil, safflower oil, palm kernel oil, sunflower oil, palm oil, rapeseed oil or the like. The non-milk fats can, if desired, be used as the sole fat component of the sauce composition (i.e., the milk solids if employed consisting essentially of fat-free solids) or in conjunction with milk fats derived from a suitable milk component. In alternate embodiments of the invention, however, the fat content of the sauce composition will be derived from a milk component (e.g., whole milk, cream).

Sufficient fat is employed to provide a desirable mouthfeel. Desirably, the level of fat does not significantly affect the viscosity or its relative stability at the temperatures discussed above. Fat levels of from about 1 to 10%, preferably from 2.5 to 5%, are desired. The level of fat will in part depend on its relative percentage of solids and liquid portions at the temperatures involved. Preferably, essentially all of the solids should melt at a temperature below 36° C., otherwise a waxy coating may be left on the tongue after eating. It is not essential, however, that the fat remain fluid at freezer temperature. In fact one preferred fat is a soybean oil hydrogenated to an iodine value of 85 to 90 and a Wiley melting point of 15° to 18° C.

Further required for the preferred fudge sauce, is the presence of a hydrophilic food colloid in an amount effective to maintain stability during freeze/thaw cycling. The hydrophilic colloid will also desirably maintain product viscosity at elevated temperatures within the ranges discussed above. Any of the acceptable hydrophilic food colloids can be employed, including both natural gums, such as xanthan gum, guar gum, and synthetically prepared materials, such as carboxymethylcellulose. Among these, those such as xanthan gum, which tend to provide a degree of slipperiness in the mouth are most preferred. They are typically employed at levels of from about 0.05 to 0.15%, the amount of course varying with the specific gum type and the other ingredients.

In addition to the above ingredients, the fudge sauce of the invention will preferably contain milk solids, typically supplied as dry non-fat milk solids. These dry solids will contain about half of their weight as sugars, predominantly lactose, and about half protein. The lactose is a disaccharide and will contribute its weight to the disaccharide portion of the mix as discussed above. When added as milk or cream, the milk solids will obviously be added along with water and butter fat which are taken into account for their contributions to each of these categories above.

The fudge sauce is typically prepared in a batch process but could be prepared continuously if desired. According to one procedure, water is mixed with the fat or oil component at a temperature at which all fat is liquid. As the water and oil are agitated, liquid ingredients including saccharide syrups are added and suitably mixed, say five to ten minutes. The dry ingredients are then added to the hopper of a high-shear, in-line mixer which blends them thoroughly with the liquid ingredients to prepare a smooth liquid, free of lumps. This liquid is then cooked at high-temperature, short-time conditions suitable for the specific starch and other heat sensitive ingredients employed. The cooked fudge sauce is then cooled and brought to about 15° C. for packaging.

In one embodiment the fudge sauce is packaged in single serving containers for use as is. These containers can be drawn plastic cups with suitable covers. Where it is desired to heat the product by microwave prior to serving, the packaging material should be transparent to microwave energy. It is an advantage of the invention that the sauce can be quickly microwave heated to a smooth consistency due at least in part to its flowable character at freezer temperatures and its relatively temperature-stable viscosity.

In another embodiment, the fudge sauce is combined with a frozen comestible such as ice cream to form a ready-to-eat frozen dessert. Desirably, a stick is inserted and the confection is topped with a hardened candy, e.g., chocolate or like, coating.

To prepare a product of this type, an ice cream mix of desired flavor and fat content is partially frozen and deposited to partially fill each of a series of ice cream bar molds. The consistency of the ice cream at this point is like that of commercially-available soft ice cream. The molds are then passed through a brine solution maintained at a suitable temperature of from about −25° to about −40° C. where the outer portions of the ice cream, those in contact with the cooled mold walls, begin to solidify. A pencil shaped injector nozzle is then inserted into each deposit of ice cream and a desired amount of fudge sauce, say 10 to 100% of the weight of the ice cream, is injected to fill the interior of each deposit and displace the ice cream upwardly in the individual molds. A stick is then inserted into each resulting center-filled deposit. The center-filled deposits are then hardened further; removed from the molds, dipped in a hardenable coating liquid, wrapped, packaged in point of purchase containers, cartoned and placed in frozen storage.

The contrast of the various textures straight from the freezer is at first an unexpected and then a sought after experience. Preferably, the coating will be real chocolate and may have crunchy puffed rice, chopped nuts or other inclusions to provide an added degree of interest and enjoyment.

DESCRIPTION OF BEST MODE

The following examples are presented for the purpose of describing preferred embodiments of the invention which aid in further illustrating the invention to those skilled in the art. Unless otherwise indicated, all parts and percentages are by weight for the particular formulation at the stage in processing indicated.

EXAMPLE 1

A chocolate fudge sauce is prepared from the following ingredients:

| Ingredients | Parts |
| --- | --- |
| Water | 32.9 |
| Corn syrup 42 D.E. | 24.4 |
| Sucrose Syrup, 67.5% solids | 22.2 |
| Granular Sucrose | 5.0 |
| Cocoa, Medium Fat, Dutched | 4.5 |
| Milk, Non-Fat Dry | 4.1 |
| Oil, Soybean, Partially Hydrogenated, Durkee 100° F. | 3.0 |
| Starch, Tapioca, Modified Freezist M Staley | 2.3 |
| Cocoa, Natural, Medium Fat | 1.5 |
| Xanthan Gum | 0.1 |

The fudge sauce is typically prepared in a batch process by first mixing the water with the fat or oil component at a temperature at which all fat is liquid. The water and oil are agitated, and the liquid ingredients including saccharide syrups are added and mixed in a Lightnin mixer for five to ten minutes. The dry ingredients are then added to the hopper of a Triblender high-shear, in-line mixer which blends them thoroughly with the liquid ingredients to prepare a smooth liquid, free of lumps. This liquid is then HTST cooked at 89°±2° C. with a two-minute hold time. The cooked fudge sauce is then cooled to about 15° C. for packaging.

EXAMPLE 2

A caramel fudge sauce is prepared from the following ingredients:

| Ingredient | Parts |
| --- | --- |
| Water | 42.8 |
| 42 DE Corn syrup | 39.0 |
| Non-Fat Dry Milk | 7.1 |
| Sugar | 5.5 |
| Durtex 100F (oil) | 3.5 |
| Freezist M starch | 1.5 |
| Xanthan Gum | .1 |
| Caramel Flavor | .3 |
| Caramel Color | .2 |

The sauce is prepared by the process described above in Example 1.

EXAMPLE 3

The sauce of Example 1 is employed to prepare a frozen confection. A vanilla ice cream mix having 15% fat content is partially frozen and deposited to partially fill each of a series of ice cream bar molds. The consistency of the ice cream at this point is like that of commercially-available soft ice cream. The molds are then passed through a brine solution maintained at a temperature of about −40° C. When the portions of the ice cream in contact with the cooled mold walls begin to solidify, a pencil-shaped injector nozzle is inserted into each deposit of ice cream. A fudge sauce approximating 25% of the weight of the ice cream, is injected to fill the interior of each deposit and displace the ice cream upwardly in the individual molds. A stick is then inserted into each resulting center-filled deposit. The center-filled deposits are then hardened further; removed from the molds, dipped in a hardenable liquid chocolate, wrapped, packaged in point of purchase containers, cartoned and placed in frozen storage.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A ready-to-eat dessert comprising a frozen confection and a fudge sauce flowable at freezer temperature, the fudge sauce being an aqueous mixture comprising mixed saccharides, modified food starch, fat and hydrophilic colloids, wherein the dynamic viscosity of the sauce is less than $5 \times 10^4$ poise at $-12°$ C. and is relatively stable in viscosity over a temperature range of from $-10°$ C. to $+10°$ C., the slope of the plot of temperature versus the logarithm to the base 10 of dynamic viscosity being within the range of from $-0.1/°$ C. to $-0.001/°$ C.

2. A ready-to-eat dessert according to claim 1 wherein the frozen confection is ice cream and the fudge sauce further comprises milk solids.

3. A ready-to-eat dessert according to claim 1 wherein the dynamic viscosity is less than $2 \times 10^4$ poise at $-16°$ C.

4. A ready-to-eat dessert according to claim 1 wherein the frozen confection comprises ice cream and the fudge sauce is flowable at a temperature of $-12°$ C. and comprises: water; mono, di and polysaccharides in proportions effective to reduce the freezing point of the water to below $-12°$ C. while providing a sweetness approximately that of sucrose; modified food starch in an amount effective to build viscosity at $-12°$ C.; fat in an amount effective to provide a desirable mouthfeel while not significantly affecting the viscosity of the sauce at $-12°$ C.; and, an amount of a hydrophilic colloid effective to stabilize the viscosity through freeze-thaw cycling and at higher temperatures.

5. A ready-to-eat dessert according to claim 4 wherein the ice cream portion envelopes a center filling of the fudge sauce, and a stick is inserted into the center filling.

6. A ready-to-eat dessert according to claim 5 wherein the frozen confection is coated with a hardened candy coating.

7. A ready-to-eat dessert according to claim 6 wherein the coating is chocolate.

8. A ready-to-eat dessert according to claim 7 wherein the fudge sauce comprises from 40 to 50% water; 35 to 50% of a mixture of mono, di and polysaccharides, said mixture comprising from 5 to 25% monosaccharides, from 25 to 70% disaccharides, and from 25 to 65% polysaccharides other than starch; from 1 to 3% modified food starch; from 2.5 to 5% fat; and from 0.05 to 0.15% of a hydrophilic colloid.

9. A dessert according to claim 1 wherein the fudge sauce comprises: water; mono, di and polysaccharides in proportions effective to reduce the freezing point of the water to below $-12°$ C. while providing a sweetness approximately that of sucrose; modified food starch in an amount effective to build viscosity at $-12°$ C., fat in an amount effective to provide a desirable mouthfeel while not significantly affecting the viscosity of the sauce at $-12°$ C.; and, an amount of a hydrophilic colloid effective to stabilize the viscosity through freeze-thaw cycling and at higher temperatures.

10. A dessert according to claim 9 wherein the fudge sauce includes from 30 to 55% of a mixture of mono, di and polysaccharides and said mixture comprises from 5 to 25% monosaccharides, from 25 to 70% disaccharides, and from 25 to 65% polysaccharides other than starch.

11. A fudge sauce which is flowable at freezer temperature, the fudge sauce being an aqueous mixture comprising mixed saccharides, modified food starch, fat and hydrophilic colloids, wherein the sauce exhibits a dynamic viscosity of $5 \times 10^4$ poise or less at $-12°$ C. and is relatively stable in viscosity over a temperature range of from $-10°$ C. to $+10°$ C., the slope of the plot of temperature versus the logarithm to the base 10 of dynamic viscosity being in the range from $-0.1/°$ C. to $-0.001/°$ C.

12. A fudge sauce according to claim 11 which further comprises milk solids.

13. A fudge sauce according to claim 11 wherein the dynamic viscosity is less than $2 \times 10^4$ poise at $-16°$ C.

14. A fudge sauce according to claim 11 which is flowable at a temperature of $-12°$ C. and comprises: water; mono, di and polysaccharides in proportions effective to reduce the freezing point of the water to below $-12°$ C. while providing a sweetness approximately that of sucrose; modified food starch in an amount effective to build viscosity at $-12°$ C.; fat in an amount effective to provide a desirable mouthfeel while not significantly affecting the viscosity of the sauce at $-12°$ C.; and, an amount of a hydrophilic colloid effective to stabilize the viscosity through freeze-thaw cycling and at higher temperatures.

15. A fudge sauce which is flowable at a temperature of $-12°$ C. and comprises: from 30 to 60% water; mono, di and polysaccharides in proportions effective to reduce the freezing point of the water to below $-12°$ C. while providing a sweetness approximately that of sucrose; up to 10% modified food starch, the amount effective to build viscosity at $-12°$ C; 1 to 10% fat, the amount effective to provide a desirable mouthfeel while not significantly affecting the viscosity of the sauce at $-12°$ C.; and an amount of a hydrophilic colloid effective to stabilize the viscosity.

16. A fudge sauce according to claim 15 which includes from 30 to 55% of a mixture of mono, di and polysaccharides and said mixture comprises from 5 to 25% monosaccharides, from 25 to 70% disaccharides, and from 25 to 65% polysaccharides other than starch.

17. A fudge sauce according to claim 16 which includes from 0.05 to 0.15% xanthan gum.

18. A fudge sauce according to claim 16 wherein the dynamic viscosity is less than $2 \times 10^4$ poise at $-16°$ C.

19. A fudge sauce according to claim 16 wherein the sauce is relatively stable in viscosity over a temperature range of from $-10°$ C. to $+10°$ C., the slope of the plot of temperature versus the logarithm to the base 10 of dynamic viscosity being within the range of from $-0.1/°$ C. to $-0.001/°$ C.

* * * * *